(12) United States Patent
Baker

(10) Patent No.: US 10,395,446 B2
(45) Date of Patent: Aug. 27, 2019

(54) INTEGRATED WIRELESS DATA SYSTEM FOR AVIONICS PERFORMANCE INDICATION

(71) Applicant: TECAT PERFORMANCE SYSTEMS, LLC, Ann Arbor, MI (US)

(72) Inventor: Douglas M. Baker, Ypsilanti, MI (US)

(73) Assignee: Tecat Performance Systems, LLC, Ann Arbor, MI (US)

(*) Notice: Subject to any disclaimer, the term of this patent is extended or adjusted under 35 U.S.C. 154(b) by 0 days.

(21) Appl. No.: 15/586,990

(22) Filed: May 4, 2017

(65) Prior Publication Data
US 2017/0323496 A1    Nov. 9, 2017

Related U.S. Application Data

(60) Provisional application No. 62/331,639, filed on May 4, 2016.

(51) Int. Cl.
| | | |
|---|---|---|
| *B64F 5/60* | (2017.01) | |
| *G01L 1/26* | (2006.01) | |

(Continued)

(52) U.S. Cl.
CPC ............ *G07C 5/0825* (2013.01); *B64C 11/30* (2013.01); *B64D 45/00* (2013.01); *B64F 5/60* (2017.01);
(Continued)

(58) Field of Classification Search
USPC ........................................................ 701/29.1
See application file for complete search history.

(56) References Cited

U.S. PATENT DOCUMENTS

| 4,611,377 A * | 9/1986 | McCormick ....... B23Q 3/15553 |
| | | 29/407.05 |
| 6,577,319 B1 * | 6/2003 | Kashiwagi ............ G06F 3/0481 |
| | | 345/581 |

(Continued)

FOREIGN PATENT DOCUMENTS

| EP | 2303694 A2 * | 4/2011 | ............. B64D 31/12 |
| GB | 2466817 A * | 7/2010 | ............. G01H 1/003 |
| WO | WO-2009062635 A1 * | 5/2009 | ............... B64C 1/12 |

OTHER PUBLICATIONS

Google translate english translation of EP2303694B1 (Jun. 6, 2018).*

*Primary Examiner* — Jean Paul Cass

(74) *Attorney, Agent, or Firm* — John S. Artz; Dickinson Wright PLLC

(57) ABSTRACT

An integrated wireless data system and method for avionic performance indication for measuring, monitoring and displaying in-use, real-world engine-out characteristics on a propeller driven aircraft for the purposes of health monitoring, performance optimization, and regulatory compliance is provided. Engine-out characteristics may be measured either at the propeller extension hub mounted between the engine and propeller, on the crankshaft flange, or on the propeller itself, and include, but are not limited to, the engine output torque, thrust, vibration, bending loads and temperature. Data may be transmitted wirelessly to a base unit located inside the cockpit and user selected parameters are updated on a display in real-time. The system may also store all collected data, for later download and analysis. The system may also have a software interface that can be used to download, view and analyze all recorded data, as well as to configure the system settings and alerts.

12 Claims, 6 Drawing Sheets

(51) Int. Cl.
  *G01L 5/16* (2006.01)
  *G07C 5/08* (2006.01)
  *B64C 11/00* (2006.01)
  *B64C 11/30* (2006.01)
  *B64D 45/00* (2006.01)

(52) U.S. Cl.
  CPC ............... *G01L 1/26* (2013.01); *G01L 5/16* (2013.01); *G07C 5/0841* (2013.01); *B64C 11/00* (2013.01); *B64D 2045/0085* (2013.01); *Y02T 50/53* (2013.01)

(56) References Cited

U.S. PATENT DOCUMENTS

| | | | |
|---|---|---|---|
| 7,103,460 B1* | 9/2006 | Breed | B60C 23/0408 701/29.1 |
| 8,813,581 B2 | 8/2014 | Huhnd et al. | |
| 8,982,784 B2* | 3/2015 | Muller | H04Q 9/00 370/328 |
| 8,991,267 B1 | 3/2015 | Kenney et al. | |
| 9,038,458 B2* | 5/2015 | Becker | B29C 73/10 73/432.1 |
| 2002/0168618 A1* | 11/2002 | Anderson | A61F 2/07 434/262 |
| 2003/0090792 A1* | 5/2003 | Kenny | G02B 21/06 359/385 |
| 2005/0192727 A1* | 9/2005 | Shostak | B60C 11/24 701/37 |
| 2006/0025897 A1* | 2/2006 | Shostak | B60C 23/005 701/1 |
| 2006/0170508 A1* | 8/2006 | Tanaka | H03B 5/18 331/154 |
| 2006/0212194 A1* | 9/2006 | Breed | G07C 5/008 701/1 |
| 2007/0271014 A1* | 11/2007 | Breed | B60J 10/00 701/31.9 |
| 2008/0086240 A1* | 4/2008 | Breed | G07C 5/008 701/1 |
| 2011/0158806 A1* | 6/2011 | Arms | F03D 1/0658 416/31 |
| 2012/0083911 A1* | 4/2012 | Louboutin | G06F 1/1632 700/94 |
| 2017/0323496 A1* | 11/2017 | Baker | G07C 5/0825 |
| 2017/0363079 A1* | 12/2017 | Baker | F04B 49/065 |

* cited by examiner

INTEGRATED WIRELESS DATA SYSTEM FOR AVIONICS PERFORMANCE INDICATION

CROSS REFERENCE TO RELATED APPLICATION

This U.S. Utility application claims the benefit of U.S. Provisional Application Ser. No. 62/331,639 filed May 4, 2016, which is incorporated herein by reference in its entirety.

FIELD OF DISCLOSURE

The present disclosure generally relates to an integrated wireless data system for avionics performance indication used to measure operational characteristics of a propeller driven aircraft under real-world operating conditions and a method for measuring operational characteristics of the propeller driven aircraft under real-word operating conditions.

BACKGROUND OF THE DISCLOSURE

Safety is of paramount concern in the aviation industry, and an ability to warn the pilot of potential impending issues is desired. A sensor system capable of measuring torque output, vibration, thrust, bending loads and engine speed of an engine over time is one potential indicator of engine and propeller health that is not currently being monitored due to the challenges of measuring these parameters long-term.

In addition, data such as engine output torque and thrust can be used to optimize the aircraft setup, either for improved performance or for improved fuel economy. Such optimization strategies are currently limited, as torque data is typically only collected during testing and certification stages of an aircraft. Long-term engine torque measurements have hitherto not been available at all, or have not been available due to the high cost of obtaining such information.

In addition, some aviation authorities, such as the Federal Aviation Administration (FAA) in the United States, require that aircraft engine output torque be measured dynamically over a range of speeds, with the engine and propeller attached to the airframe. For these three reasons, health monitoring, performance optimization and regulatory requirements, it is desirable to measure such data in the real-world, and record the data throughout the life of the aircraft.

Furthermore, it is sometimes desirable for a pilot to view this data both in flight and during pre-flight engine run-ups, and to use the information in conjunction with other engine data to establish warning parameters, with displays and alerts shown in the cockpit. Such data could also enable the pilot to avoid undesirable operating conditions, such as resonant frequencies of the propeller drive system. Since the propeller is rotating with respect to the aircraft cockpit, a wired device cannot be used for this application.

One example of a current system includes U.S. Pat. No. 8,991,267 B1, which discloses a wireless engine torque measuring system and housing mounted to a hub located between the engine and the propeller. The disclosed system contains a wireless measuring device that transmits a strain gauge signal to a receiver using a cable-less communications system, and details the housing used to protect the measuring device. The system is designed to meet the regulatory requirements of measuring engine output torque, but does not measure other operating characteristics such as bending loads and thrust. It also does not address power requirements of the system, which is desired of long-term measurements, and does not address the collection of high speed data, which is necessary to determine individual engine cylinder performance. In addition, it does not disclose real-time display of the data, or methods to use the data except to report engine torque. The system also requires the use of a bulky housing to protect the measuring device, adding cost and weight to the aircraft. The system is also limited to measuring torque and temperature. Furthermore, the system relies on mono-directional communications from the remote unit to the base unit, precluding the ability to alter data collection parameters, such as data rate.

Another example of a current system is U.S. Pat. No. 8,813,581 B2, which discloses a force measuring device mounted to a hub located between the engine and propeller. In this device, coils are required to power the measuring device and to transmit the data to a base unit. These coils limit the system to use in a wind tunnel. However, this device also does not disclose real-time display of the data, long-term data collection, or methods to use the data for health monitoring purposes.

Due to the limitations of the prior art, there is a need for an engine output measuring and monitoring system capable of operating throughout the life of an aircraft, and capable of displaying high-speed, real-time data to the pilot for pre-flight and in-flight use. There is also a need for a configurable warning system, should measurement data fall outside the limits of a pre-configured range. There is also a need for a transceiver based system that uses bi-directional communications for the purposes of updating data collection parameters. Furthermore, there is a need for a system that can be left in the aircraft for long-term health monitoring.

SUMMARY OF THE DISCLOSURE

According to an aspect of the disclosure, the system may include a remote unit mounted to a propeller system of the propeller driven aircraft and having at least one sensor and a remote transceiver and an A/D converter and at least one digitally controlled switch and a microprocessor and an energy harvesting device. The system may also include a power storage device connected to and for providing power to the remote unit. The base unit can be located inside a cockpit of the propeller driven aircraft and have a base transceiver and a microprocessor and onboard data storage and a real-time display connected to other aircraft systems and an aircraft electrical system of the propeller driven aircraft. The system can also include a wireless communications interface between the remote unit and the base unit, wherein real-time and bi-directional data is transmitted therebetween. According to another aspect of the disclosure, a method for measuring operational characteristics of a propeller driven aircraft under real-world operating conditions is also provided. The method can include the step of installing a remote unit on one of a propeller extension and a crankshaft flange and a propeller of the propeller driven aircraft. The method proceeds by measuring operational characteristics of the propeller driven aircraft including strain and temperature and vibration. The remote unit then wirelessly transmits the operational characteristics to a base unit located within a cockpit of the propeller driven aircraft. The method can also include the step of converting the measured strain to at least one of an orthogonal bending and an axial strain and a torque. The method continues by compensating the operational characteristics for temperature effects. The method concludes with the step of displaying the compensated operational characteristics in real-time using the base unit.

According to yet another aspect, a method to configure an integrated wireless data system including a base unit in wireless communication with a remote unit and to download and analyze data collected by the integrated wireless data system is also provided. The method begins by collecting data using the remote unit and the base unit. The next step of the method can be downloading the data from the base unit onto a PC. The method continues by installing a software package on the PC. Next, reading the data collected by the remote unit and base unit and storing the data in a database for analysis and historical comparisons using the software package. The method concludes by configuring the base unit to specify at least one of a plurality of selected parameters to measure and data rates for each selected parameter and limits for a warning system.

The system and methods disclosed herein have various advantages over current systems. For example, the system and methods provide an engine output measuring and monitoring system capable of operating throughout the life of an aircraft, and capable of displaying real-time data to the pilot for pre-flight and in-flight use. The system and method also provide for a configurable warning system, should measurement data fall outside the limits of a pre-configured range.

BRIEF DESCRIPTION OF THE DRAWINGS

Other aspects of the present disclosure will become better understood by reference to the following description when considered in connection with the accompanying drawings wherein.

DETAILED DESCRIPTION OF THE PRESENT DISCLOSURE

Detailed aspects of the present disclosure are provided herein; however, it is to be understood that the disclosed aspects are merely exemplary and may be embodied in various and alternative forms. It is not intended that these aspects illustrate and describe all possible forms of the disclosure. Rather, the words used in the specification are words of description rather than limitation, and it is understood that various changes may be made without departing from the spirit and scope of the disclosure. As those of ordinary skill in the art will understand, various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations. Additionally, the features and various implementing embodiments may be combined to form further examples of the disclosure.

Figure 1:
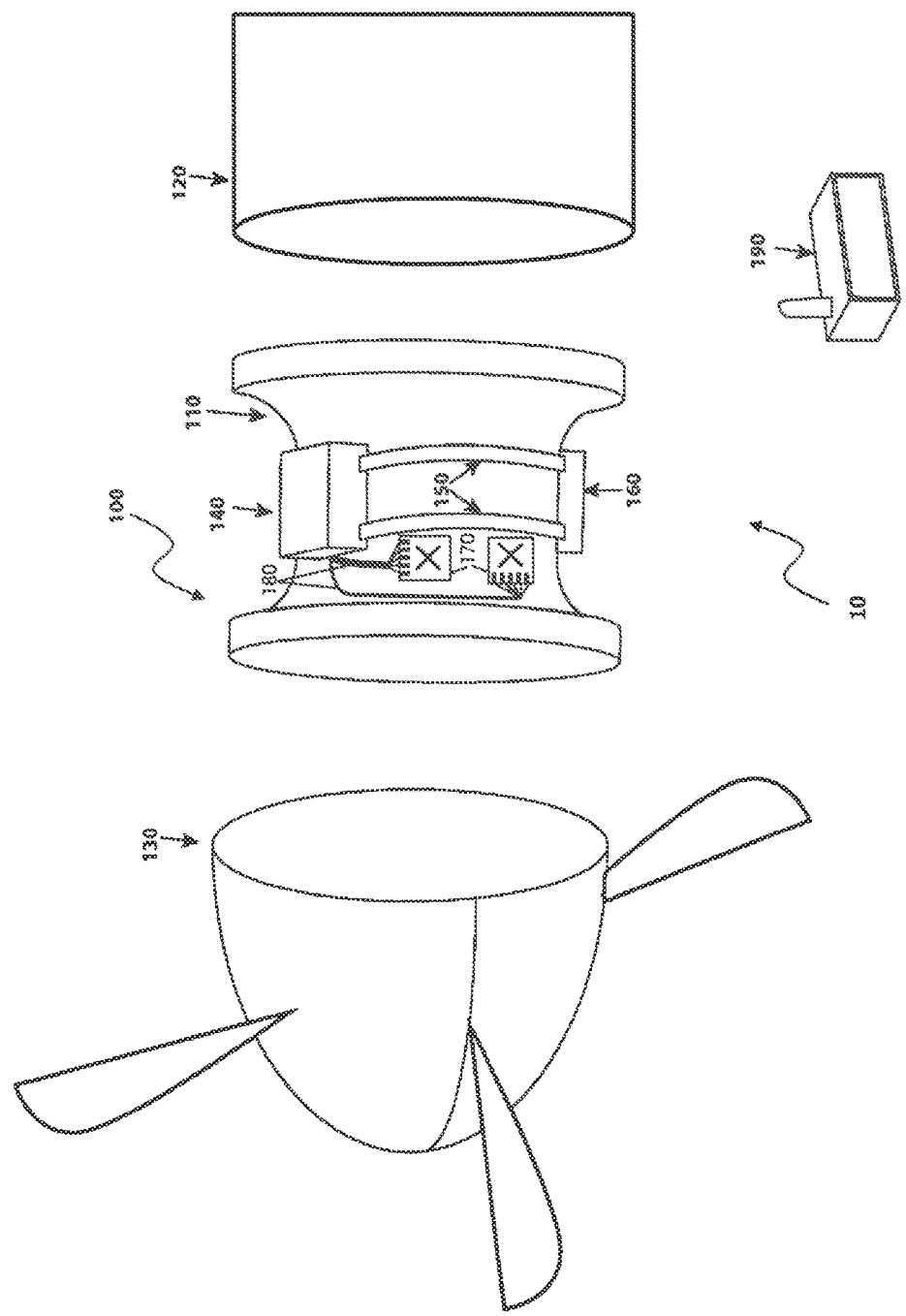
FIG. 1 is an exploded side view of an integrated wireless data system for avionics performance indication mounted on a propeller extension in accordance with an aspect of the present disclosure.

FIG. 1 shows an exploded side view of an integrated wireless data system 10 for avionics performance indication for a propeller driven aircraft in accordance with an aspect of the present disclosure. The integrated wireless data system 10 can include a remote unit 100 that may be mounted to a propeller system, specifically to a propeller extension 110, which may be mounted between an engine 120 and a propeller 130 of the propeller driven aircraft. The remote unit 100 can include a sensor unit 140 that may be packaged in a light-weight plastic housing, which may contain two slots for worm-drive style clamps 150 to attach the sensor unit 140 to the propeller extension 110. These clamps 150 may also be used to mount a power storage device 160 of the remote unit 100, such as a battery to the propeller extension 110 (e.g., mounted 180° away from the sensor unit 140 so as to balance the sensor unit 140. The sensor unit 140 may contain a plurality of sensors, discussed in more detail below. The sensor unit 140 may include gauge circuitry to connect to individual legs of one or more full Wheatstone bridge strain gauges 170 via one or more cables 180, such as a ribbon-cable, to measure strain in various directions across the propeller extension 110. The sensor unit 140 may also be in wireless communication with a base unit 190 located inside a cockpit of the propeller driven aircraft. In one example, the base unit 190 may be mounted behind the dashboard of the cockpit to show selected parameters, alerts and notifications through the dash.

Figure 2:
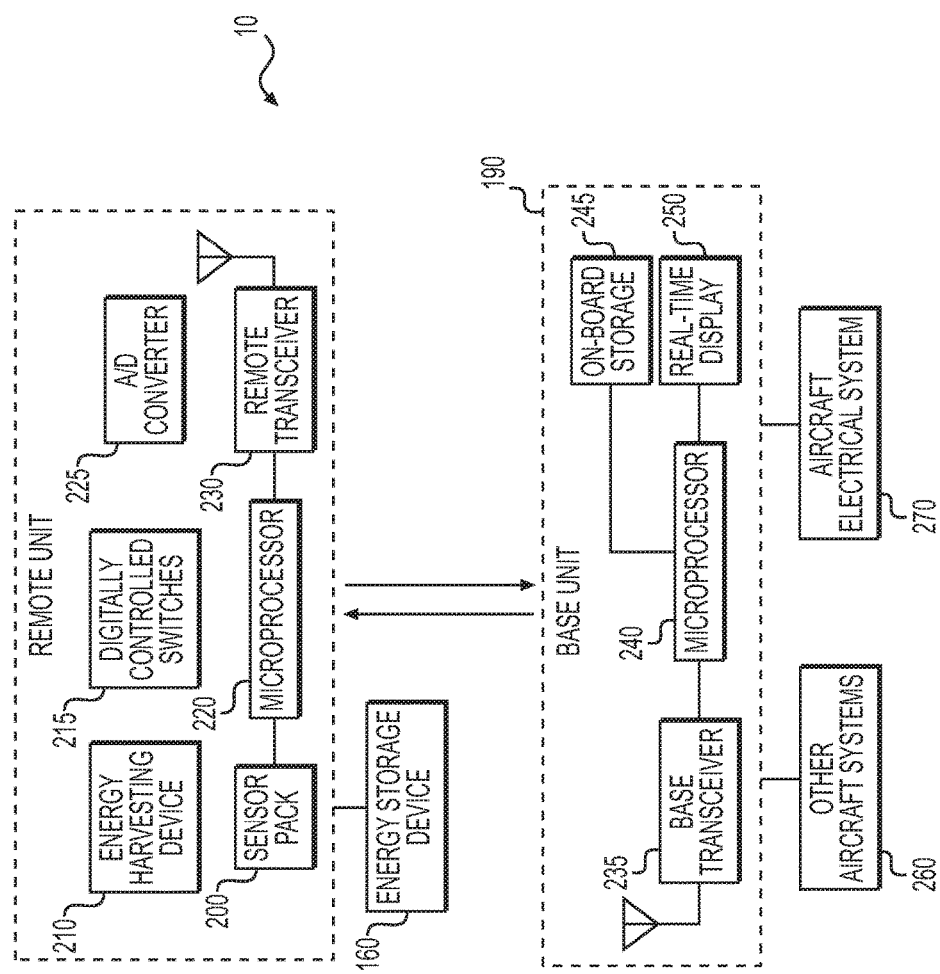
FIG. 2 is a block diagram of an example of the system architecture during in-flight use in accordance with an aspect of the present disclosure.

FIG. 2 is a block diagram of an example of the system architecture during in-flight use in accordance with an aspect of the present disclosure. In particular, FIG. 2 shows the system architecture of the remote unit 100 and the base unit 190. The remote unit 100 may include a sensor pack 200, which can include the plurality of sensors including, but not limited to, an accelerometer, a temperature sensor, and strain gauge connectivity. The temperature sensor may be used to compensate for temperature effects on the strain measurements and/or to display actual temperature data. Accelerometer data may be used to detect excessive vibrations in the remote unit 100. The sensor unit 140 may be connected to the energy storage device 160. The remote unit 100 (e.g., the sensor unit 140) can also incorporate an energy harvesting device 210, such as a piezoelectric or inductive device for harvesting the kinetic energy from the vibrations of the propeller 130. The remote unit 100 may contain a microprocessor 220 and an A/D converter 225 that resolves all collected data to a digital signal, which is then transmitted to the base unit 190 via a remote transceiver 230. In more detail, the base unit 190 can include a base transceiver 235, which can enable wireless communication with the remote transceiver 230 of the remote unit 100. The remote unit 100 (e.g., as part of sensor unit 140) may also contain a plurality of low impedance, digitally controlled switches 215 to enable rapid reconfiguration of the gauge circuitry to measure various strain components with the strain gauges 170

(i.e., the same gauge set), including but not limited to orthogonal bending strains, pure axial strain and torque. In one example, the transceiver 235 on the base unit 190 could send an instruction to the transceiver 230 on the remote unit 100 to change from measuring torque data to measuring bending data, which requires independent detection of strain in two orthogonal planes to capture the total bending vector, comprised of both magnitude and direction. A similar instruction could be sent to the digitally controlled switches 215 to change the gauge circuitry (i.e., gauge configuration) for measuring thrust (axial load). By measuring both torque and thrust and knowing the engine RPM and relative air speed, the wireless integrated measurement system 10 provides a direct measure of an efficiency of the propeller 130, which can be used in real-time to optimize propellers 130 with a variable pitch or be an early indicator of a potential stall of the propeller 130.

A power management strategy for the remote unit 100 is also disclosed. Ultra-low power algorithms enable the combination of three key characteristics that are critical to the performance of the wireless integrated data system 10: long-term use, up to two or three years without the need to recharge or replace batteries in the remote unit 100 due to the ultra-low power consumption (e.g., less than 4 microamps per data point); high-speed data collection (e.g., rate of at least 4 kHz), necessary to capture high frequency torsional oscillations caused by inertial and thermodynamic cycle loading; and high power transmission (i.e., a predetermined power), needed to ensure that data is able to be transmitted from the remote unit 100 to the base unit 190 under real-world operating conditions, which, in this case, include interference from the propeller 130 and interference from other RF signals. As part of this algorithm, the remote unit 100 enters a sleep mode when not in use, further minimizing power consumption. This strategy may be combined with the energy harvesting device 210. In addition, because the system 10 contains a transceiver 230, the remote unit 100 can be set to periodically collect high frequency measurements in order to assess system diagnostics, and then be changed to collect data at a lower rate, further lowering energy consumption.

The digital signal from the sensor unit 140 may be received at the base unit 190 by the base transceiver 235. The base unit 190 may be connected to and powered from an aircraft electrical system 270. In one example, the base unit 190 may be also connected to other aircraft systems 260 and can be capable of importing signals or data from the other aircraft systems 260 for use in algorithms for aircraft diagnostics. Data from the other aircraft systems 260 can include, but is not limited to, engine RPM, electrical load, vacuum, magneto data, oil temperature, oil pressure, and fuel flow. The base unit 190 can also include a microprocessor 240 coupled to an onboard storage 245 and a real-time display 250 and can be configured to perform any necessary calculations and send data to both the onboard storage 245 and to the real-time display 250 that may be mounted in the cockpit of the propeller driven aircraft.

Figure 3:
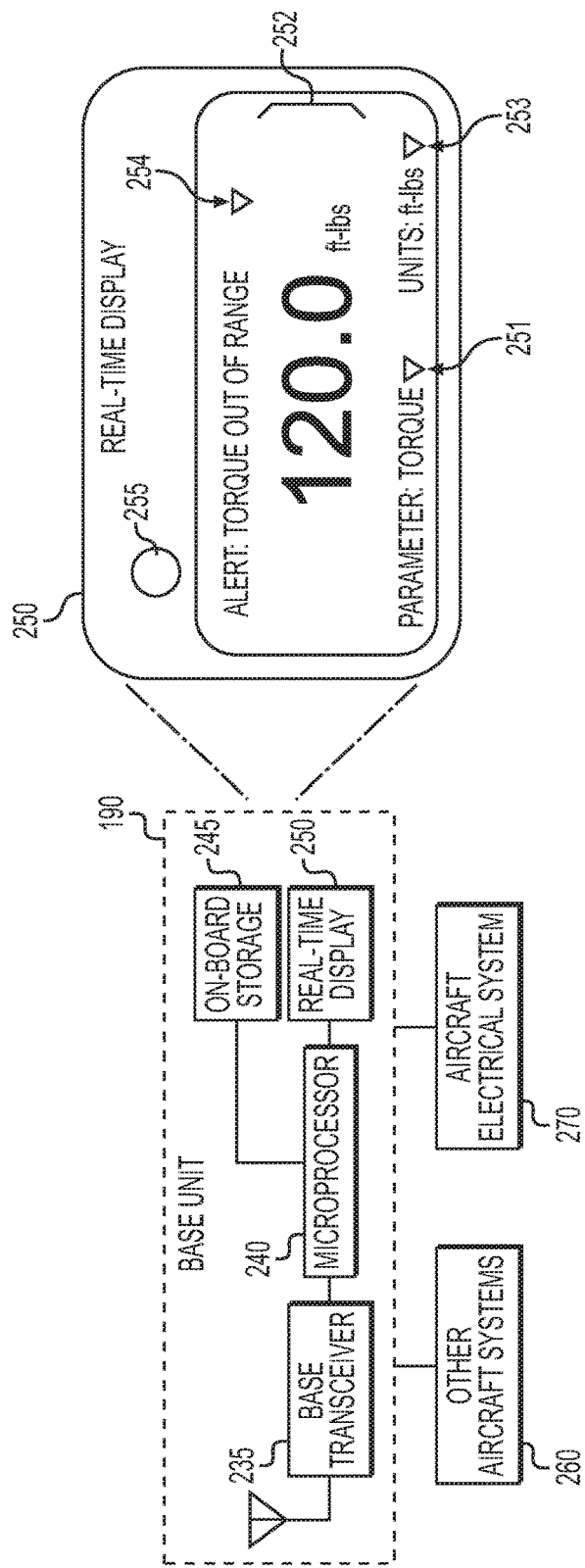
FIG. 3 is a block diagram of the system architecture with a touch screen display used as the in-cockpit display, enabling limited configuration from the dashboard in accordance with an aspect of the present disclosure.

FIG. 3 shows one exemplary embodiment of the real-time display 250. The real-time display 250 could be a touch screen display showing one or more selected parameters 252 and including menus 251, 253 and at least one selected alert 254 and warning indicator 255. The pilot could select the menu 251 to specify which selected parameter 252 to display on the real-time display 250. Additionally, the pilot could select the menu 253 to select the units to display for the selected parameter 252. The pilot can also select the desired warning indicator 254, in the instance when multiple warning indicators are configured. The real-time display 250 would indicate the selected warning 254, and the warning indicator 255 would be activated if the selected parameter 252 does not meet a specified criteria.

Figure 4:
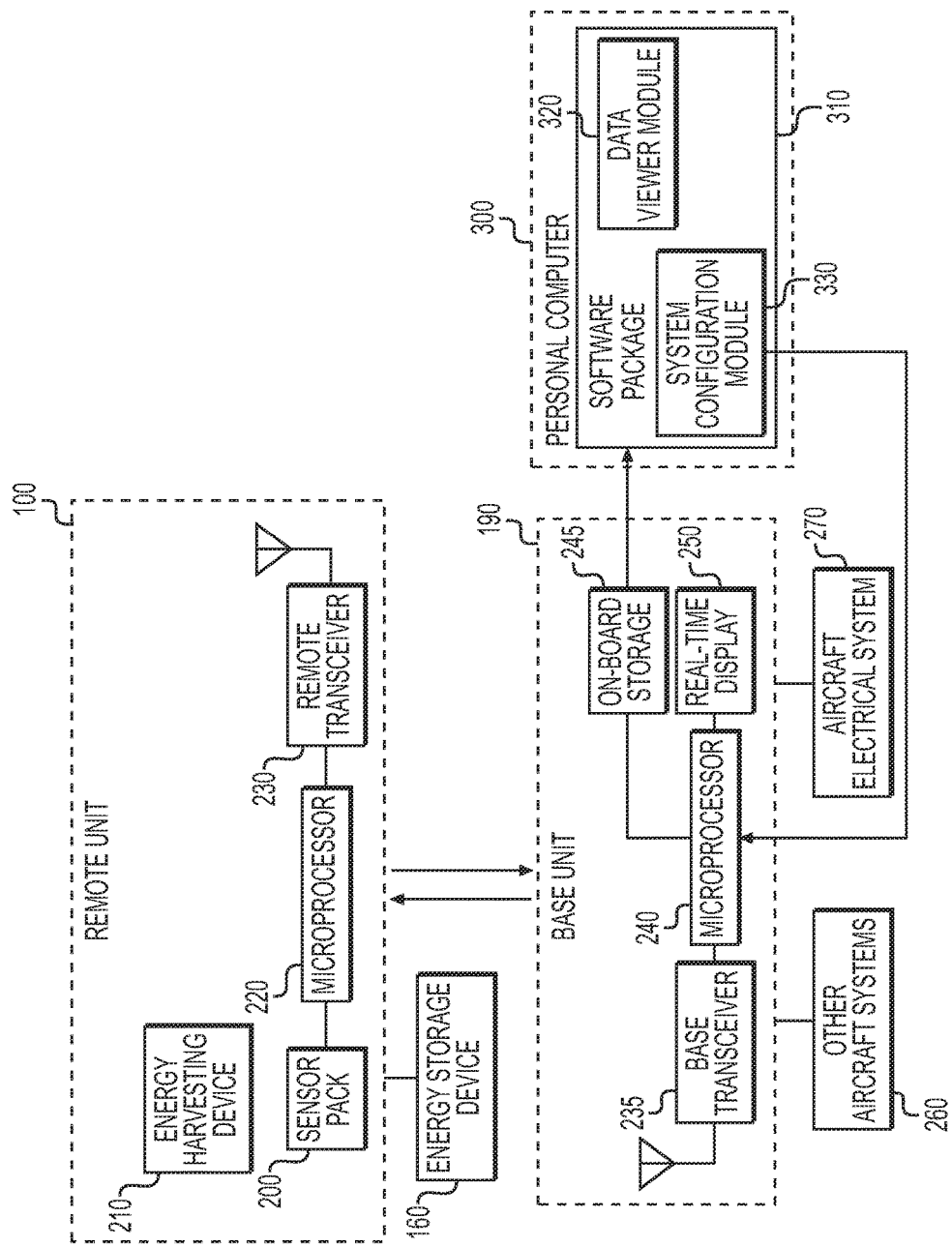
FIG. 4 is a block diagram of an example of the system architecture with PC connectivity in accordance with an aspect of the present disclosure.

FIG. 4 is a block diagram of an example of the system architecture with personal computer (PC) connectivity in accordance with an aspect of the present disclosure. Specifically, FIG. 4 shows the system architecture when communications are established with a PC 300 to enable complete system configuration options. The architecture would typically be used when the aircraft is grounded, to enable data download and analysis, and to upload configuration parameters. In this embodiment, the PC 300 includes a software package 310 that has a data viewer module 320 and a system configuration module 330. The PC 300 may be connected to the base unit 190 either with a cable or through secure wireless communications. The onboard data storage 245 of the base unit 190 can be cleared by downloading the data to PC 300. The data can be viewed using the data viewer module 320 of the software package 310, also disclosed here. The system configuration module 330 may enable the user to turn on/off different measured parameters, select the data rate for each of the parameters and to configure the limits for the real-time display 250 (i.e., warning or alert system). Once the configuration parameters are sent back to the base unit 190, the transceiver 235 in the base unit 190 sends revised parameters to the remote unit 100, so there is no need to access the remote unit 100 for the purposes of changing parameters. As an example, the system 10 (e.g., the base unit 190) can be configured to display torque, requiring that the collected strain data be resolved to torque, and the real-time torque value be sent to the real-time display 250. As another example, the system 10 can be configured to monitor both horsepower and engine revolutions per minute (RPM), and to send out an alert to the real-time display 250 should the paired values fall outside of a pre-configured range. As an additional example, the user can compare all historical data and configure the system 10 to alert the pilot if the torque falls below any previous torque data collected. Note that these are merely exemplary scenarios for configuring the alert and real-time display 250, and are not intended to exclude other potential uses of the real-time display 250 or alert systems.

Another aspect of the software package 310 includes the data viewer module 320 which stores all data downloaded from the base unit 190 in a database. The data viewer module 320 allows for historical comparisons and long-term analysis of the data.

Figure 5:
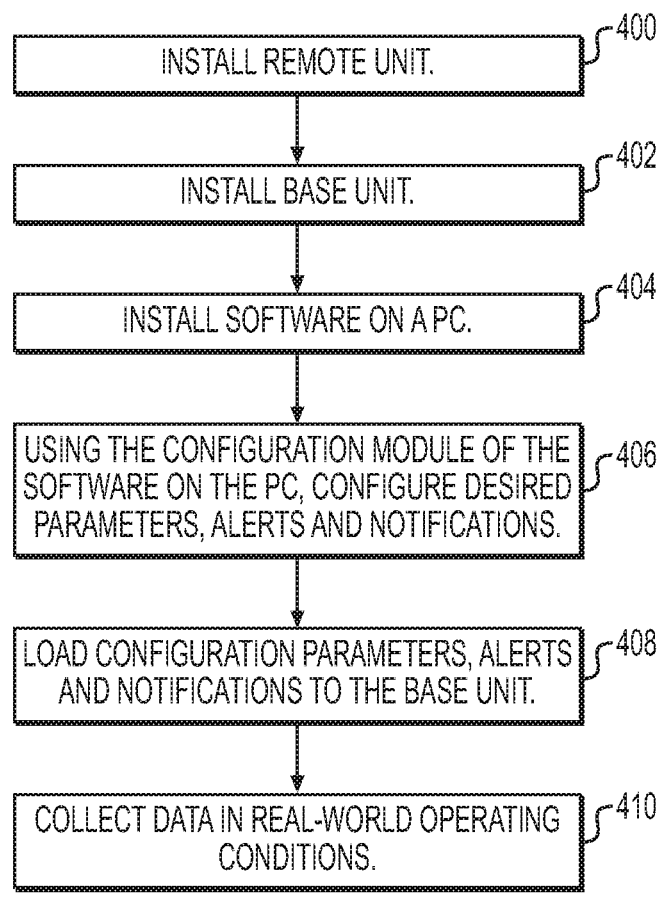
FIG. 5 is a flowchart of a method for measuring operational characteristics of a propeller driven aircraft under real-word operating conditions in accordance with an aspect of the present disclosure.

FIG. 5 is a flowchart of a method for measuring operational characteristics of a propeller driven aircraft under real-word operating conditions in accordance with the present disclosure. The remote unit 100 is installed on the propeller system (i.e., on at least one of a propeller extension 110 and the crankshaft flange and the propeller 130) of the propeller driven aircraft at step 400. The base unit 190 is installed inside the aircraft cockpit at step 402. The software package 310 is installed on the PC 300 at step 404. The software package 310 on the PC 300 is used to configure the desired parameters, alerts and notifications using the configuration module 320 of the software package 310 at step 406. These configuration parameters are loaded to the base unit 190 at step 408. Data is then collected under real-world operating conditions at step 410 (e.g., using the base unit 190). In other words, the method continues by measuring the operational characteristics of the propeller driven aircraft including strain and temperature and vibration using the remote unit 100 (e.g., to enable cylinder-by-cylinder diagnostics of the engine of the propeller driven aircraft). Then, the remote unit 190 wirelessly transmits the operational characteristics to a base unit 190 located within a cockpit of the propeller driven aircraft. The method can then include the steps of converting the measured strain to at least one of an orthogonal bending and an axial strain and a torque on a shaft of the propeller driven aircraft and compensating the operational characteristics for temperature effects. The method can conclude by displaying the compensated operational characteristics in real-time using the base unit 190.

Figure 6:
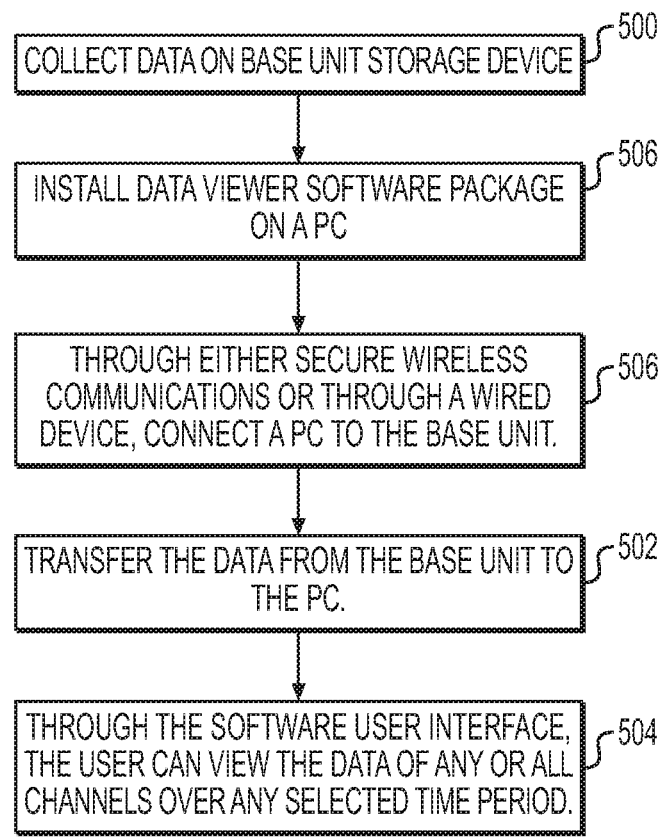
FIG. 6 is a flowchart of a method for downloading, storing and analyzing collected data through a software interface with an aspect of the present disclosure.

FIG. 6 is a flowchart of a method to store and analyze data collected from a propeller driven aircraft under real-word operating conditions in accordance with the present disclosure. The flowchart shows one example of the process that could be used to download data from the system 10 to the PC 300, review the data, and compare the data to historical data for analysis. Specifically, the method includes collecting data using the remote unit 100 and base unit 190 at step 500 (i.e., collecting data on the onboard storage 245 of the base unit 190 from the remote unit 100 of the integrated wireless data system 10) discussed above in FIG. 1 and transferring the data from the base unit 190 to the PC 300 at step 502 and providing a software user interface (e.g., data viewer module 320) for viewing the data of any or all channels (i.e., sensors of the sensor package 200) over any selected time period at step 504. The method also includes installing the software package 310 including the data viewer module 320 on the PC 300 through secured wireless communication or through a wired device connecting the PC 300 to the base unit 190 at step 506. Then, reading the data collected by the remote unit 100 and base unit 190 and storing the data in a database for analysis and historical comparisons. The method continues by configuring the base unit 190 to specify at least one of a plurality of selected parameters 252 to measure and data rates for each selected parameter 252 and limits for a warning system (i.e., real-time display 250).

The foregoing disclosure has been illustrated and described in accordance with the relevant legal standards, it is not intended that these examples illustrate and describe all possible forms of the invention, thus the description is exemplary rather than limiting in nature. Variations and modifications to the disclosed embodiment may become apparent to those skilled in the art and fall within the scope of the invention. Additionally, the features and various implementing embodiments may be combined to form further examples of the invention.

What is claimed is:

1. An integrated wireless data system for avionics performance indication used to measure operational characteristics of a propeller driven aircraft under real-world operating conditions comprising:
    a remote unit mounted on a propeller system of the propeller driven aircraft and having at least one sensor for measuring the operational characteristics and a remote transceiver and an A/D converter and a microprocessor and an energy harvesting device;
    said remote unit including a power storage device connected to and for providing power to said remote unit;
    a base unit located inside a cockpit of the propeller driven aircraft and having a base transceiver and a microprocessor and an onboard data storage and a real-time display and connected to other aircraft systems and an aircraft electrical system of the propeller driven aircraft;
    a wireless communications interface between said remote unit and said base unit, wherein real-time and bi-directional data is transmitted therebetween; and
    wherein said power storage device of said remote unit and said at least one sensor are disposed on a propeller extension between an engine and a propeller of the propeller driven aircraft 180 degrees opposite one another to balance said remote unit and said at least one sensor.

2. The system of claim 1, wherein said at least one sensor includes at least one strain gauge with individual legs connected to said remote unit and wherein said remote unit is configured to measure various strain components of a shaft of the propeller driven aircraft including bending and axial strain and torque.

3. The system of claim 2, wherein said remote unit further includes gauge circuitry including digitally controlled switches used to reconfigure said gauge circuitry to measure different components of said at least one strain gauge and enable the measurement of bending and axial strain and torque from said at least one strain gauge.

4. The system of claim 2, wherein said at least one sensor includes a temperature sensor used to provide both raw temperature data and temperature compensation of data from said at least one strain gauge.

5. The system of claim 1, wherein said at least one sensor includes an accelerometer used to measure for display on said real-time display.

6. The system of claim 1, wherein said base unit is configured to send a signal to said remote unit so as to alter at least one of parameters of the data being measured and a data rate of the operational characteristics being measured.

7. The system of claim 1, wherein said transceiver of said base unit and said transceiver of said remote unit are each configured to operate with a predetermined transmission power to ensure minimal data drops between said base unit and said remote unit when operating in real-world conditions.

8. The system of claim 1, wherein said base unit is adapted to be configured by an end user to alter parameters displayed on said real-time display.

9. The system of claim 1, wherein said base unit includes onboard storage to store data for later analysis.

10. The system of claim 1, wherein the signal from said base unit alters the data rate of the operational characteristics being measured separately from one another.

11. The system of claim 1, wherein said base unit is configured to import and use data from the other aircraft systems.

12. The system of claim 1, wherein said power storage device and said at least one sensor are attached to the propeller extension using at least one clamp extending circumferentially about the propeller extension.

* * * * *